United States Patent
Karlsson

(10) Patent No.: US 11,223,416 B2
(45) Date of Patent: Jan. 11, 2022

(54) COMMUNICATION SYSTEM FOR AIRCRAFTS WITH ALTITUDE BASED ANTENNA TYPE SELECTION

(71) Applicant: Icomera AB, Gothenburg (SE)

(72) Inventor: Mats Karlsson, Vålberg (SE)

(73) Assignee: ICOMERA AB, Gothenburg (SE)

( * ) Notice: Subject to any disclaimer, the term of this patent is extended or adjusted under 35 U.S.C. 154(b) by 0 days.

(21) Appl. No.: 16/613,158

(22) PCT Filed: May 16, 2018

(86) PCT No.: PCT/EP2018/062727
§ 371 (c)(1),
(2) Date: Nov. 13, 2019

(87) PCT Pub. No.: WO2018/210930
PCT Pub. Date: Nov. 22, 2018

(65) Prior Publication Data
US 2020/0195339 A1 Jun. 18, 2020

(30) Foreign Application Priority Data
May 17, 2017 (SE) .................... 1750613-0

(51) Int. Cl.
*H04B 7/185* (2006.01)
*H04B 7/06* (2006.01)
(Continued)

(52) U.S. Cl.
CPC ....... *H04B 7/18506* (2013.01); *H04B 7/0608* (2013.01); *H04B 7/0814* (2013.01);
(Continued)

(58) Field of Classification Search
CPC ............ H04B 7/185006; H04B 7/0608; H04B 7/0814; H04B 7/18504; H04W 84/005; H04W 84/06
(Continued)

(56) References Cited

U.S. PATENT DOCUMENTS

| 5,245,347 A | * | 9/1993 | Bonta | G01S 7/2813 |
| | | | | 342/149 |
| 10,972,176 B2 | * | 4/2021 | Karlsson | H04W 84/06 |

(Continued)

FOREIGN PATENT DOCUMENTS

| EP | 2023685 A1 | 2/2009 |
| WO | 2008053151 A1 | 5/2008 |
| WO | 2015169917 A1 | 11/2015 |

OTHER PUBLICATIONS

International Search Report (PCT/ISA/210) dated Jul. 5, 2018, by the European Patent Office as the International Searching Authority for International Application No. PCT/EP2018/062727 (3 pages).
(Continued)

*Primary Examiner* — Mong-Thuy T Tran
(74) *Attorney, Agent, or Firm* — Buchanan Ingersoll & Rooney P.C.

(57) ABSTRACT

A system and method for providing wireless data communication between a wireless communication system in an aircraft and a stationary communication server outside the aircraft are disclosed. The wireless communication system includes a plurality of antennas, and a router in the aircraft configured to transmit and receive wireless data communication to and from a stationary communication server outside the aircraft through at least one ground base station via at least one of the plurality of antennas. The plurality of antennas includes at least one omnidirectional antenna and at least one directional antenna. The router includes a control unit configured to restrict the wireless data communication
(Continued)

to solely occur through the at least one directional antenna the when the current altitude of the aircraft is determined to be above a predefined altitude threshold value.

18 Claims, 7 Drawing Sheets

(51) Int. Cl.
    *H04B 7/08* (2006.01)
    *H04W 84/00* (2009.01)
    *H04W 84/06* (2009.01)

(52) U.S. Cl.
    CPC ...... *H04B 7/18504* (2013.01); *H04W 84/005* (2013.01); *H04W 84/06* (2013.01)

(58) Field of Classification Search
    USPC .......................................................... 455/431
    See application file for complete search history.

(56) References Cited

U.S. PATENT DOCUMENTS

| | | | |
|---|---|---|---|
| 2004/0092258 A1* | 5/2004 | Hibbs | H04B 7/18504 455/431 |
| 2008/0130539 A1 | 6/2008 | Lauer et al. | |
| 2010/0042272 A1 | 2/2010 | Gruyer et al. | |
| 2011/0032149 A1 | 2/2011 | Leabman | |
| 2012/0007982 A1 | 1/2012 | Giuffrida et al. | |
| 2012/0268319 A1* | 10/2012 | Mitchell | H01Q 25/00 342/26 B |
| 2012/0295537 A1 | 11/2012 | Zaruba et al. | |
| 2014/0004853 A1* | 1/2014 | Mitchell | H04B 7/18506 455/431 |
| 2015/0102953 A1 | 4/2015 | Stayton | |
| 2017/0150373 A1* | 5/2017 | Brennan | H04W 16/28 |
| 2017/0311178 A1* | 10/2017 | Feria | H04W 16/28 |
| 2018/0005535 A1* | 1/2018 | Kalathil | H04W 4/021 |
| 2018/0247544 A1* | 8/2018 | Mustafic | H04W 36/0083 |

OTHER PUBLICATIONS

Office Action issued in the corresponding Swedish priority application dated Oct. 21, 2019 (4 pages).

Office Action (Communication pursuant to Article 94(3) EPC) dated May 27, 2021, by the European Patent Office in corresponding European Application No. 18 724 886.9-1205, (7 pages).

\* cited by examiner

COMMUNICATION SYSTEM FOR AIRCRAFTS WITH ALTITUDE BASED ANTENNA TYPE SELECTION

TECHNICAL FIELD OF THE INVENTION

The present invention relates to the field of wireless communication technology, and more specifically to a wireless communication system and method particularly suitable for aircrafts, such as helicopters and airplanes.

BACKGROUND

It is not an understatement that the last few decades have introduced vast improvements and advancements in the field of communication technology. In fact, the advent of the internet, cellular phones and more recently smart phones and tablets has greatly changed the way we communicate and quite possibly accelerated the technological field surrounding these devices. As an inevitable consequence, there is an ever increasing demand for bandwidth in order to satisfy the market need for online connectivity which results in an increased focus on constantly developing and improving the underlying technology and systems in order to accommodate this demand.

Further, there is a rapidly increasing demand from consumers to be able to communicate through mobile phones and other handheld terminals at all times, even while traveling on trains, busses, ships and even aircrafts. This is partially embodied in the increasing availability of in-flight entertainment systems and wireless communication (Wi-Fi, GSM, 3G, LTE, 5G) capability onboard aircrafts.

Wireless communication capability onboard aircrafts is not a new concept, even the earliest commercial aircrafts had rather primitive voice communication capability with ground personnel over shortwave radio, which improved flight safety and enabled accelerated commercialization of air transport. Since then, airborne communication systems have been further improved with advent of radar, computers and data links, which serve to improve in-flight safety as well as the overall traveling experience for passengers.

However, regardless of recent developments of communication platforms for aircrafts, it has proven to be difficult for presently known systems to provide robust, broadband communication for aircrafts such as helicopters, airplanes and the like.

Thus, in view of the above, there is a need for an improved wireless aircraft communication system which provides better capacity, improved reliability while still being cost effective.

SUMMARY OF THE INVENTION

It is therefore an object of the present invention to provide a wireless communication system and method for an aircraft, such as a helicopter or an airplane, which alleviates all or at least some of the drawbacks of presently known systems. Another object of the invention is to provide a means for robust and stable wireless connectivity in aircrafts. The inventive system and method are particularly suitable for aircrafts which often or normally operate at relatively low altitudes, such as low level flights.

This object is achieved by means of a wireless communication system and method for wireless data communication between a wireless communication system in an aircraft and a stationary communication server outside the aircraft, as defined in the appended claims.

According to a first aspect of the present invention, there is provided a wireless communication system for an aircraft, the wireless communication system comprising:

a router connected to a plurality of antennas, wherein the router is configured to transmit and receive wireless data communication to and from a stationary communication server outside the aircraft through at least one ground base station via at least one antenna out of the plurality of antennas;

wherein the plurality of antennas comprises at least one omnidirectional antenna and at least one directional antenna; and wherein the system is configured to restrict the wireless data communication through said at least one omnidirectional antenna when a current altitude of the aircraft is above a certain altitude, and preferably restrict the wireless data communication solely to occur through said at least one directional antenna when a current altitude of the aircraft is above a certain altitude. In particular, the router may comprise a control unit configured to restrict the wireless data communication to solely occur through the at least one directional antenna when a current altitude of the aircraft is above a predefined altitude threshold value, such as a predefined threshold or a dynamically adjustable/settable threshold.

The inventive aircraft communication system is capable of selecting the type of antenna(s) that is to be used for the wireless data communication (between the router and the ground base station(s)) based on a current altitude of the aircraft in order to optimize performance at high and low altitudes.

The restriction of communication to occur through a specific type of antenna may preferably be an active control, e.g. realized by disabling the other type(s) of antennas or by actively controlling the data routes or links. However, the restriction of communication via the omnidirectional antennas may also be made passively, by allowing the ground base station restricting or disabling at a certain altitude, due to poor link or signal quality, too much interference, and the like. At a high altitude, the communication is preferably restricted to only occur through the directional antenna(s). However, at lower heights below that high altitude, there may be a gradual transition from a unrestricted state to the fully restricted state, so that the communication through the omnidirectional antenna(s) is gradually or stepwise more and more restricted between a certain lower altitude and the certain higher altitude.

In case an altitude threshold value is used for active control of the antennas, the altitude threshold value may be one or several predefined, static value(s). However, instead of using static, predefined altitude threshold value(s), the altitude threshold value(s) may be set and adjusted dynamically, in dependence on the context and present conditions. For example, the link and/or signal quality may be monitored when the aircraft is moving upwards, and when the link or signal quality becomes too poor, an altitude threshold value may be set at the altitude when this was detected, thereby disabling or restricting the use of one or several of the antennas when the aircraft remains at altitudes above this threshold value.

The present invention is based on the realization that some of the drawbacks associated with altitude/elevation dependencies in airborne broadband connectivity based on terrestrial cellular technologies (e.g. LTE or 5G) can be overcome by employing a new antenna strategy. In more detail, it was realized that the radio link to and from the aircraft may be subject to severe interference caused by the immense amount of ground base stations (e.g. several hundreds) that is in perfect line of sight with the aircraft. This being caused by the high altitude of the aircraft and the fact that the horizon will typically be at a distance around 100 km away (at altitudes above approx. 500 m). Thus, the present inventors realized that by configuring the system to only employ directional antennas (beam antennas) at altitudes above a certain altitude/elevation it is possible to limit the interference causing the performance degradation, i.e. by limiting the transmission into a narrower sector of the ground surface. Moreover, the directional antenna(s) is/are preferably high gain directional antennas, which will cover a relatively small footprint on the ground surface and will due to higher gain pick up weaker signals (signal strength decreasing as the distance squared in free space).

The present invention is based on the realization that omnidirectional antennas often has better performance and capacity than directional antennas at lower heights, but that the capacity and performance for the omnidirectional antennas deteriorates much more rapidly than for directional antennas when the height increases.

Accordingly, by means of the present invention it is possible to use omnidirectional antennas at altitudes up to a certain level and thereafter switch over to communication solely over the directional antennas above that level, leading to improved radio performance at a wide range of altitudes.

The "router" is preferably a networking router, which is a machine that forwards data packets between computer networks, preferably on at least two data links in each direction. Stated differently, the networking router is capable of providing data communication between an internal local area network (arranged within the aircraft) and an external wide area network (WAN) outside the aircraft. The router may be a mobile access router (MAR), and preferably a mobile access and applications router (MAAR). The router further comprises means (e.g. a control unit or controller) for controlling which antennas are to be used at which altitudes. More specifically, the router preferably comprises means for selecting/defining a set of omnidirectional antennas which are to be disabled once the aircraft exceeds a certain altitude threshold value in order to force or restrict the wireless data communication between the aircraft and the ground base station(s) to one or more of the directional antennas.

Various antenna setups are considered to be feasible, e.g. passive antennas (omni monopole antennas, omni dipole antennas, high gain directional patch antennas, etc.) or passive beam forming arrays (various polarizations such as linear and circular, linear, planar, etc.). Moreover, the wireless communication system preferably comprises a plurality of omnidirectional antennas (e.g. one for each carrier) and a plurality of directional antennas. In reference to the directional antennas, they can be arranged in separate groups, each group targeting specific sectors of the ground surface. Each group of directional antennas may comprise a plurality of directional antennas (e.g. one for each modem or carrier).

Moreover, each antenna may optionally be an orthogonal pair antenna (e.g. antenna pair with orthogonal polarization), also known as cross-polarized antenna. In other words, the orthogonal antenna diversity can be realized by means of polarization diversity, i.e. by combining pairs of antennas with orthogonal polarizations (e.g. horizontal/vertical linear polarization, ±slant 45°, Left-hand/Right-hand circular polarization etc.). Such antennas are very suitable for MIMO communication.

The antennas can be close and multiple antennas can be packed in a smaller area, making it very suitable for avionic applications. In particular, the directional antennas may be arranged as patch antennas, antenna arrays etc.

Further, the router preferably comprises a plurality of modems for communication with the external stationary communication server, each modem being associated with and connected to at least one antenna. So, in a communication system adapted to be compatible with three different LTE operators and having the directional antennas arranged in four groups in order to target four preferably non-overlapping sectors of the ground surface, there may be 15 modems provided (3 for the omnidirectional antennas and 12 for the directional antennas). Preferably the router comprises at least 8 modems, more preferably at least 10 modems, and most preferably at least 15 modems.

In terms of general operation of the communication system, the router and the stationary (remote) communication server are preferably connected through a plurality of exterior mobile/cellular networks (provided by the ground base stations), which are simultaneously useable. Also, the router is preferably arranged to communicate with the stationary communication server on at least two different data links (communication routes) having different characteristics (e.g. on different frequency bands), and then to automatically separate the data traffic between the data links based on an evaluation of link quality. The evaluation of link quality may for example be executed as disclosed in WO 2015/169917, by the same applicant, said document incorporated herein by reference. The data streams are then forwarded on one or several links to and from a dedicated external server, which may be referred to as an aggregation server or gateway. The different links thereby form a single virtual link between the router and the gateway.

Thus, according to an embodiment of the present invention, the control unit is further configured to:

evaluate a data link quality between said at least one ground base station and said at least one omnidirectional antenna;

disable said at least one omnidirectional antenna when said data link quality is below a predefined quality threshold value. Stated differently, all antennas of the communication system may be used or employed continuously until the aircraft rises above a certain altitude (e.g. somewhere in the range of 500 m-1500 m), above which, communication is switched to solely occur through the directional antenna(s). This altitude may be defined by a dynamic threshold, and may consequently be detected based on increasing interference between signals from the vast amount of competing ground base stations which negatively affects radio performance.

However, in accordance with another embodiment of the present invention, the wireless communication system further comprises:

an altitude determining unit configured to determine the current altitude of the aircraft; and wherein said control unit is operably connected to said altitude determining unit, said control unit being further configured to disable wireless data communication via said at least one omnidirectional antenna when the current altitude is determined to be above a certain altitude, and preferably a predefined altitude threshold value. In other words, altitude determining unit (which may be a unit within the router or an external unit such as the aircraft's altimeter) notifies the control unit that the aircraft has reached or surpassed the predefined altitude threshold value, upon which the control unit disables wireless data communication via the omnidirectional antenna(s).

The altitude determining unit is preferably configured to continuously monitor and determine the altitude of the aircraft. Further, as mentioned, the altitude determining unit may be integrated within the control unit or a stand-alone component external to the router and associated with an altimeter/altitude meter which is configured to determine an altitude of the aircraft based on e.g. a measurement of atmospheric pressure. The control unit of the router may accordingly be coupled to the external altimeter (e.g. the altimeter of the aircraft).

However, the altitude determining unit may in some embodiments of the present invention be provided within the router, and may furthermore for example be a Global Navigation Satellite System GNSS unit, such as e.g. a GPS-unit, GLONASS-unit, Galileo-unit, etc. depending on the preferred regional system. By providing the altitude determining unit within the router, the wireless communication system becomes a stand-alone system which is easy to install and therefore can be retrofitted into existing aircrafts without requiring any coupling to the aircraft's integrated altimeter.

The plurality of antennas may be mounted to an external surface of the aircraft. External surface may be understood as the "chassis" of the aircraft, including the aircraft fuselage, wings, stabilizers, etc. Thus, the antennas may be mounted on any part of aircraft, however, naturally not in such a manner so that they impair the function or operational safety. However, all or some of the plurality of antennas may be integrated in an external surface of the aircraft.

The certain altitude may comprise a first altitude threshold value; and
  the control unit may further be configured to:
  receive and store a second altitude threshold value which is lower than the first altitude threshold value,
  disable wireless data communication via the at least one directional antenna when the current altitude is determined to be below the second altitude threshold value.

Stated differently, the system may be arranged with two different altitude thresholds, for example 1000 m and 500 m, accordingly, the control unit is configured to actively enable or disable the antenna(s) based on the determined current altitude of the aircraft. More specifically, the control unit may then be configured to only allow wireless data communication via the omnidirectional antenna(s) when the altitude of the aircraft is below the lower threshold, such as 500 m, by disabling the directional antennas. However, once the aircraft reaches above the first threshold, i.e. the higher threshold altitude of e.g. 1000 m the control unit can be configured to disable the omnidirectional antennas, thereby restricting the wireless communication to the directional antennas. In the altitude range between the two altitude threshold values the control unit may be configured to enable and thereby allow communication via both the directional antenna(s) and the omnidirectional antenna(s).

Moreover, in accordance with yet another embodiment of the present invention, the plurality of antennas comprises at least two groups of directional antennas, each group comprising at least one directional antenna and each group being arranged to radiate and/or receive radio waves to and/or from essentially non-overlapping sectors of a ground surface below the aircraft. The sectors are preferably entirely non-overlapping. However, a small amount of overlap may still be acceptable, such as an area overlap of less than 25%, less than 20%, less than 15%, less than 10% or less than 5%.

By arranging the directional antenna(s) of the communication system such that they are oriented so that their "beams" to a large extent do not overlap, the negative effects of signal interference can be reduced and the overall radio performance of the communication system thereby improved. A sector is effectively just an area of the ground surface below the aircraft.

Further, the aircraft may comprise a first axis and a second axis transverse to the first axis, the first axis and second axis extending in a common horizontal plane and together define four non-overlapping sectors of the ground surface when projected onto the ground surface below the aircraft;
  wherein the plurality of antennas comprises four groups of directional antennas, each group comprising at least one directional antenna and each group being oriented to radiate and/or receive radio waves towards/from a separate non-overlapping sector. Stated differently, each group of directional antennas is arranged to target one out of four predefined sectors of the ground surface. The groups may be distributed symmetrically or asymmetrically depending on intended application and predefined specifications.

For example, three groups may be arranged to target the same side with respect to the aircraft's roll axis, while one group may be arranged to target the right side. In a more symmetric configuration, the four groups may be arranged to transmit/receive in a north-west direction, a north-east direction, a south-east direction and a south-west direction, respectively, where the aircraft's tail is referenced as "south" and the aircraft's nose is referenced as "north". Naturally, the skilled reader understands that all of the radio wave beams radiated/emitted by the directional antennas have a vertical vector component (i.e. the beams are radiated/received towards/from a ground base station).

Thus, in accordance with yet another embodiment of the present invention, the aircraft comprises a roll axis and a pitch axis which define four separate quadrant sector when projected onto a ground surface below the aircraft; and
  wherein the plurality of antennas comprises four groups of directional antennas, each group comprising at least one directional antenna and each group being oriented to radiate and/or receive radio waves towards/from a separate quadrant sector.

Further, with regards to the placement of the antennas on the aircraft, and in accordance with yet another embodiment of the present invention, the aircraft further comprises a vertical axis, and wherein said roll axis and vertical axis together define a first vertical plane, and wherein said pitch axis and vertical axis together define a second vertical plane intersecting said first vertical plane;
  wherein said first vertical plane and said second vertical plane together define four separate portions of a fuselage of the aircraft; and
  wherein said four groups of directional antennas are arranged at separate portions of said fuselage. Hereby, the aircraft's fuselage may efficiently be utilized to provide sufficient separation and shielding between each individual group of directional antennas.

The beam of each directional antenna may be predefined and fixed with respect to the aircraft's fuselage. However, the beams of the directional antennas may also be adjustable. The beam forming can be obtained mechanically, e.g. by mounting the antennas on movable surfaces such that their beams with respect to the aircraft may be controlled and altered. The beam forming may also be obtained electronically, while the antenna is physically fixed, by electronically controllable antennas. Such electronic beam forming can be made in each antenna component, or by controlling a group of antennas in correlation. The beam forming control can be made by the control unit, by the modems and the like.

Further, the plurality of antennas may comprise at least two omnidirectional antennas distributed along a length of the aircraft.

According to another aspect of the invention, there is provided a method for wireless data communication between a wireless communication system in an aircraft and a stationary communication server outside the aircraft, the method comprising:

providing a router within the aircraft, the router being connected to a plurality of antennas and configured to transmit and receive wireless data communication to and from the stationary communication server outside the aircraft through at least one ground base station via at least one antenna out of the plurality of antennas, wherein the plurality of antennas comprises at least one omnidirectional antenna and at least one directional antenna;

restricting the wireless data communication through said at least one omnidirectional antenna when a current altitude of the aircraft is above a certain altitude, and preferably restricting said wireless data communication to occur solely through said at least one directional antenna when a current altitude of said aircraft is above a certain altitude. Preferably, the wireless data communication is restricted to solely occur through the at least one directional antenna when a current altitude of the aircraft is above an altitude threshold value, such as a predefined threshold or a dynamically adjustable/settable threshold.

With this aspect of the invention, similar advantages and preferred features are present as in the previously discussed first aspect of the invention, and vice versa. For example, the method may further comprise:

determining the current altitude of the aircraft; and disabling wireless data communication via the at least one omnidirectional antennas when the current altitude is determined to be above a predefined altitude threshold value.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein:

FIG. 3b is a schematic top-view illustration of the aircraft in FIG. 3a;

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the detailed embodiments described in the following are related to helicopters. However, it is to be acknowledged by the skilled reader that the method and system are correspondingly useable on other aircrafts, such as airplanes and the like.

Figure 1:
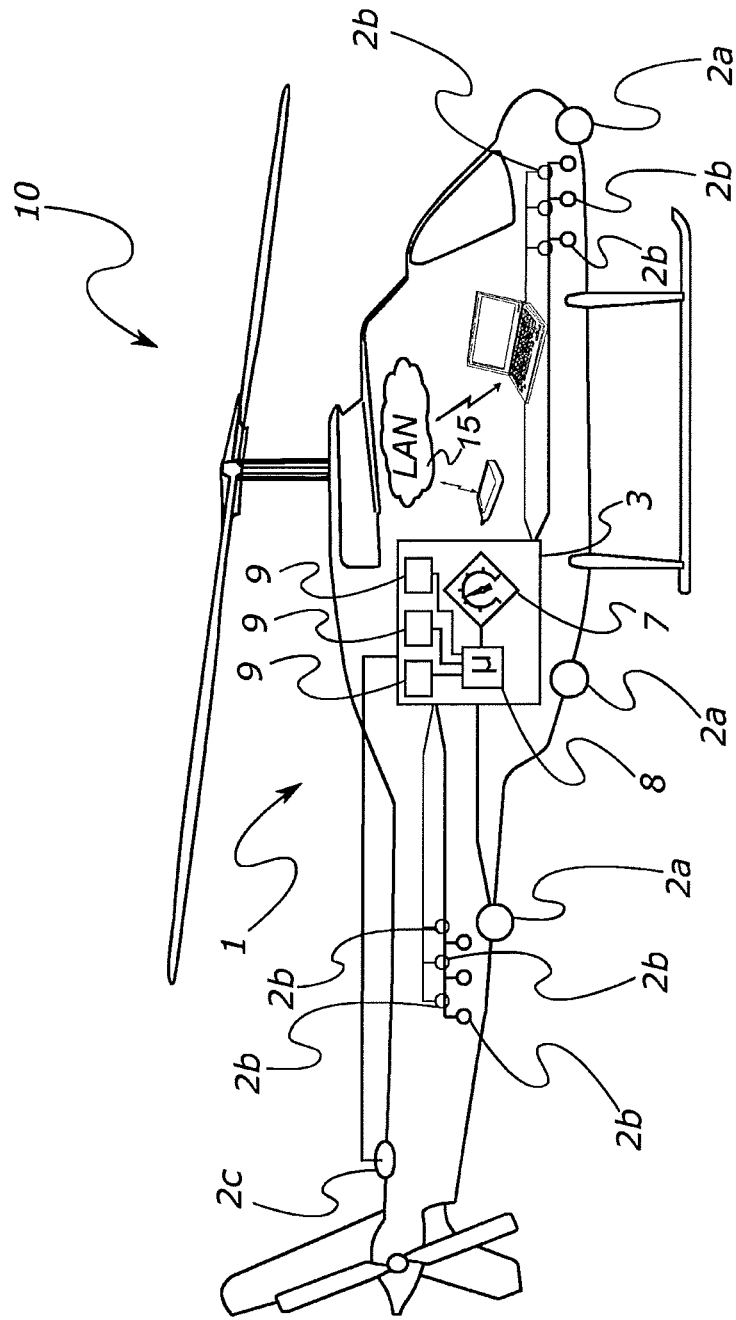
FIG. 1 is a schematic side-view illustration of an aircraft having a wireless communication system in accordance with an embodiment of the present invention.

FIG. 1 is a schematic illustration of an aircraft 10, here in the form of a helicopter, having a wireless communication system 1 in accordance with an embodiment of the invention. The wireless communication system 1 has a data communication router 3 and a plurality of antennas 2a, 2b, 2c connected to the router 3. The router 3 is configured to receive and transmit data between an internal local area network (LAN) 15, and one or several external wide area networks (WANs). The external wide area networks are preferably cellular networks provided by one or more ground base stations (see e.g. ref. 6a, 6b, 6c in FIGS. 2-4).

The system 1 comprises a plurality of antennas 2a-2c such as at least one omnidirectional antenna 2a (three in the illustrated embodiment), at least one directional antenna 2b (twelve in the illustrated embodiment) and optionally one or more satellite antennas 2c (one in the illustrated embodiment). The omnidirectional antennas 2a may for example be passive antennas such as e.g. omni monopole antennas or omni dipole antennas. The directional antennas 2b may for example be passive beam forming arrays having various polarizations. Moreover, each antenna 2a-2c may be realized as an antenna orthogonal pair by e.g. using a dual polarized antenna setup with a 90-degree angle between two linear polarizations or using circular left- and right handed polarizations. However, in alternative embodiments spatial diversity may be utilized to achieve orthogonal antenna diversity.

The antennas 2a-2c may be mounted to an external surface of the aircraft 10, such as e.g. to the aircraft's 10 fuselage 11. However, the antennas 2a-2c may also be integrated in the external surface of the aircraft 10. A combination of these two is also feasible.

The router 3 further has a plurality of modems 9, where each antenna 2a-2c, or each antenna orthogonal pair, preferably is assigned and connected to a separate modem 9. In case of the latter each modem 9 is preferably provided with 2 antenna ports for connection to each orthogonal antenna pair. However, each modem may also be provided four or more ports for compliance with MIMO (Multiple Input Multiple Output) systems. Even though only 3 modems are shown in the illustration it is apparent for the skilled reader that the router 3 may include a larger number of modems 9, and that this was avoided in order to avoid cluttering in the drawings. More specifically, in the embodiment illustrated in FIG. 1 with 3 omnidirectional antennas 2a, 12 directional antennas 2b and 1 satellite antenna 2c the router preferably comprises 15 modems.

Figure 3A:
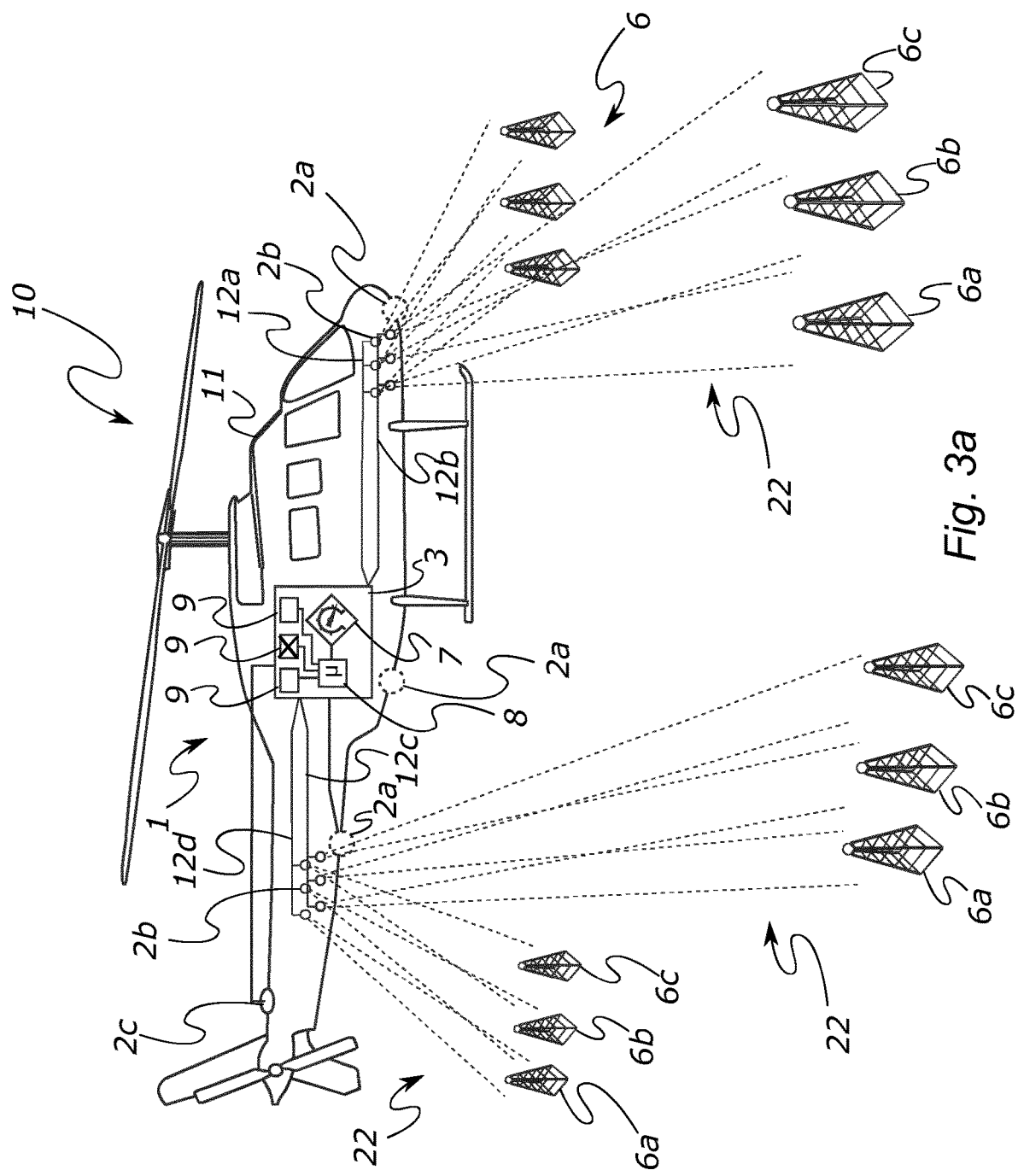
FIG. 3a is a schematic side-view illustration of an aircraft having a wireless communication system, the aircraft being at an altitude above some predefined altitude threshold, in accordance with an embodiment of the present invention.
Figure 4:
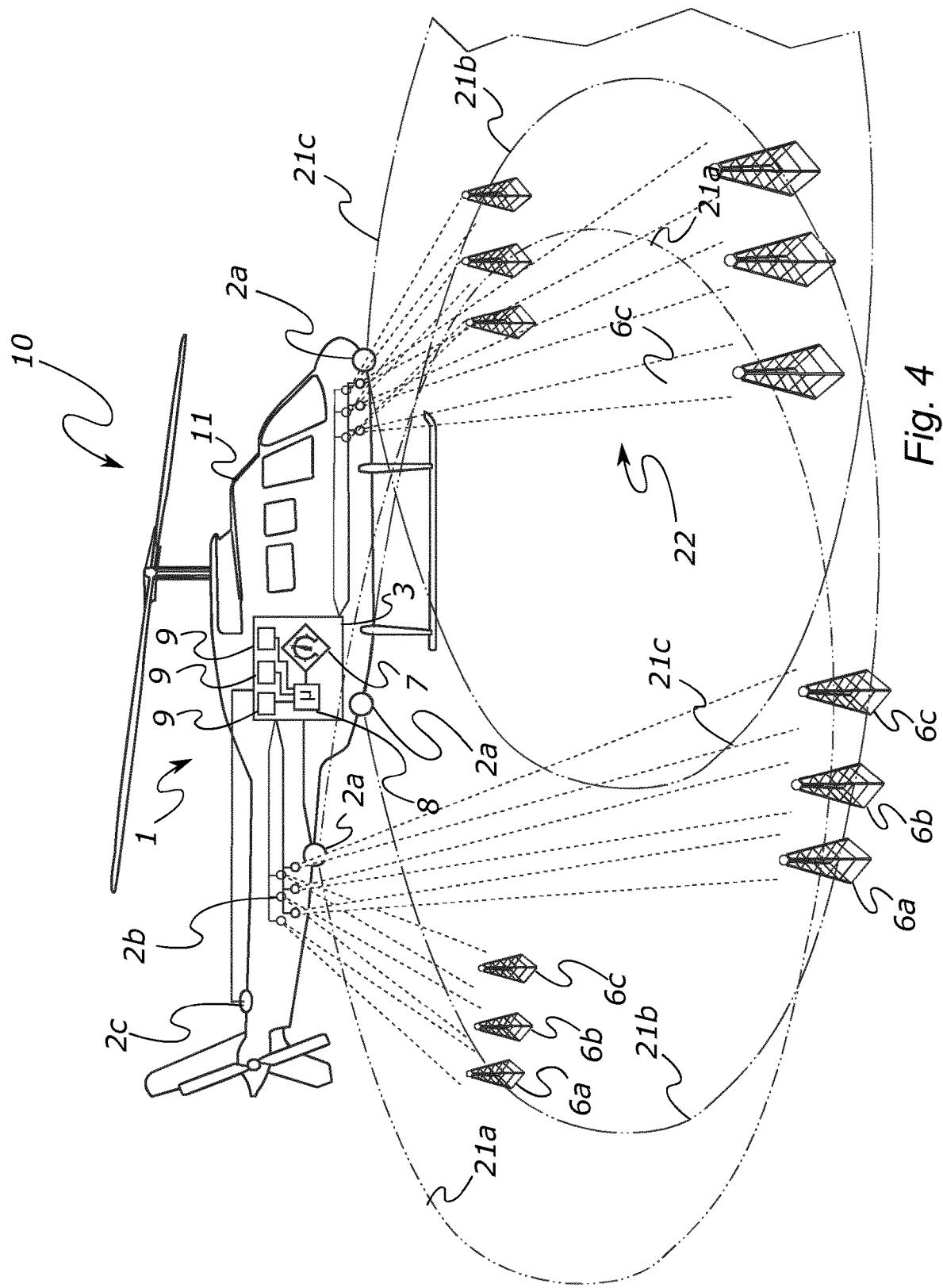
FIG. 4 is a schematic side-view illustration of an aircraft having a wireless communication system, the aircraft being at an altitude between two predefined altitude thresholds, in accordance with an embodiment of the present invention.

Further, the router 3 has a control unit 8 (e.g. a microprocessor) configured to restrict the wireless data communication to solely occur through the directional antennas 2b, when a current altitude of the aircraft 10 is above a predefined altitude threshold value (see e.g. FIG. 3a). The control unit 8 is preferably realized as a software controlled processor. However, the control unit 8 may alternatively be realized wholly or partly in hardware. Further, the control unit 8 may for example be configured to evaluate a data link quality between the ground base station(s) and each omnidirectional antenna 2a. If the data link quality is too poor and below a predefined quality threshold, e.g. due to high signal interference, the control unit is configured to disable the omnidirectional antennas 2a (e.g. by disabling the modems 9 associated with the omnidirectional antennas 2a) and thereby restrict the communication to occur solely through the directional antennas 2b.

However, the router 3 may alternatively be provided with an altitude determining unit 7 configured to determine a current altitude of the aircraft 10. The altitude determining unit 7 is preferably configured to continuously monitor and determine the altitude of the aircraft, and may for example be a Global Navigation Satellite System, GNSS, provided within the router 3, such as e.g. GPS, GLONASS, Galileo system, BeiDou system, etc. By providing a GNSS internally within the router 3, installation of the wireless communication system 1 is facilitated as there is no need for establishing an operational connection between the aircraft's 10 internal altimeter (not shown) and the router. Moreover, the inventive system 1 may thereby easily be retrofitted into existing aircrafts 10. Thus, the control unit 8 may accordingly be connected to the altitude determining unit 7, and configured to disable wireless data communication with the omnidirectional antennas 2a when the current altitude of the aircraft 10 is determined to be above a predefined altitude threshold value.

The altitude threshold value may be any value in the range of 500 m to 1500 m, such as for example, 600 m, 700 m, 800 m, 900 m, 1000 m, 1100 m, 1200 m, 1300 m or 1400 m. In particular, it is preferred that the height at which the communication through the omnidirectional antenna(s) is restricted or disabled is in the range of 200-5000 m, and preferably 500-3000 m, and most preferably 500-1500 m.

However, the control unit 8 may be configured to store a plurality of altitude threshold values. In more detail, the control unit 8 may be configured to receive two altitude threshold values, a first altitude threshold value (e.g. 1000 m) above which, the wireless data communication solely occurs through the directional antennas 2a (see e.g. FIGS. 3a-3b), and a second altitude threshold value (e.g. 500 m) below which, the wireless data communication solely occurs through the omnidirectional antennas 2a (see e.g. FIG. 2). Moreover, the control unit 8 may be configured to allow wireless data communication to occur through any suitable antenna 2a-2b, if the current altitude of the aircraft 10 is determined to be between the aforementioned two threshold values, as e.g. illustrated in FIG. 4.

Figure 2:
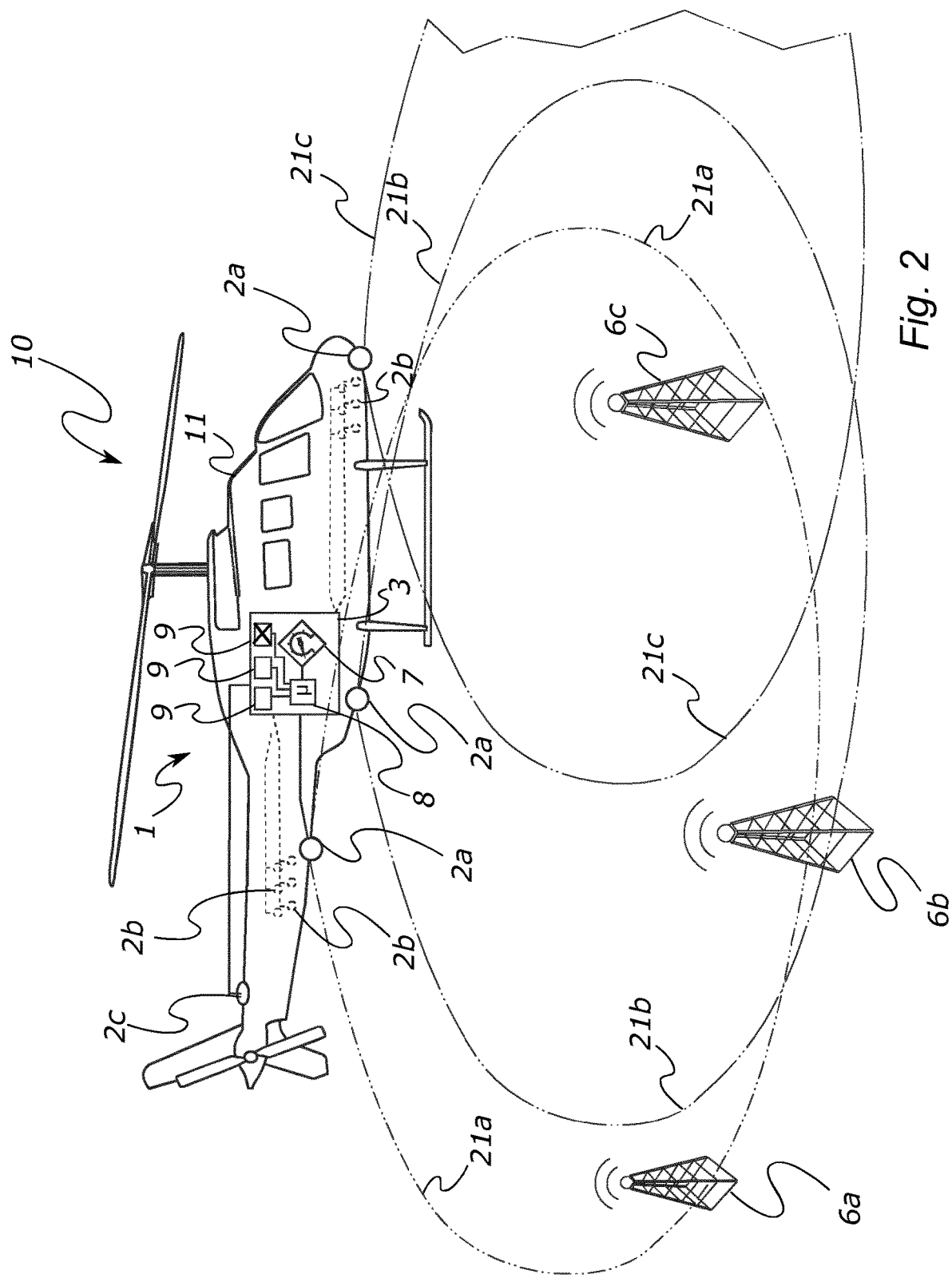
FIG. 2 is a schematic side-view illustration of an aircraft having a wireless communication system, the aircraft being at an altitude below some predefined altitude threshold, in accordance with an embodiment of the present invention.

FIG. 2 schematically illustrates an aircraft 10 from a side-view perspective, having a wireless communication system 1 according to an embodiment of the invention. In more detail, the control unit 8 has determined that the current altitude is below a predefined threshold value (e.g. by means of the altitude determining unit 7 or radio link evaluation) and therefore disabled the directional antennas 2b, in order to restrict the wireless data communication between the router and the ground base stations 6a-6c to solely occur through the omnidirectional antennas 2a. The "radio wave beams" for the omnidirectional antennas 2a are schematically indicated by the broken lines 21a-21c.

In each of the embodiments illustrated in FIGS. 2, 3a, 3b and 4, the system 1 is arranged to be compatible with three different cellular network operators which are represented by a corresponding ground base station 6a, 6b and 6c respectively. Therefore, each system 1 in these embodiments comprises three omnidirectional antennas 2a, and each group of directional antennas 2b has three directional antennas 2b. Further, the plurality of omnidirectional antennas 2a are preferably distributed along a length of the aircraft, and the directional antennas 2b are preferably arranged in individual groups in order to target non-overlapping sectors of the ground surface below the aircraft 10.

FIG. 3a schematically illustrates the aircraft 10 from FIG. 2b, however, at a higher altitude. More specifically, it serves to illustrate how the wireless communication system 1 operates when the aircraft 10 is determined to be above a predefined altitude threshold (illustratively indicated by the meter in the altitude determining unit 7). Here, the omnidirectional antennas 2a have been disabled, or more specifically, wireless data communication via the omnidirectional antennas 2a has been disabled. Thus, the wireless data communication is restricted to solely occur through the directional antennas 2b, as schematically indicated by the "radio wave beams" 22.

Moreover, the directional antennas 2b are arranged in separate groups 12a-12d in order to target specific sectors of the ground surface below the aircraft 10. In more detail, the wireless communication system 1 comprises four groups 12a-12d of directional antennas 2b, each group being arranged or oriented to radiate and/or receive radio waves to and/or from non-overlapping sectors of the ground surface below the aircraft 10.

Figure 3B:
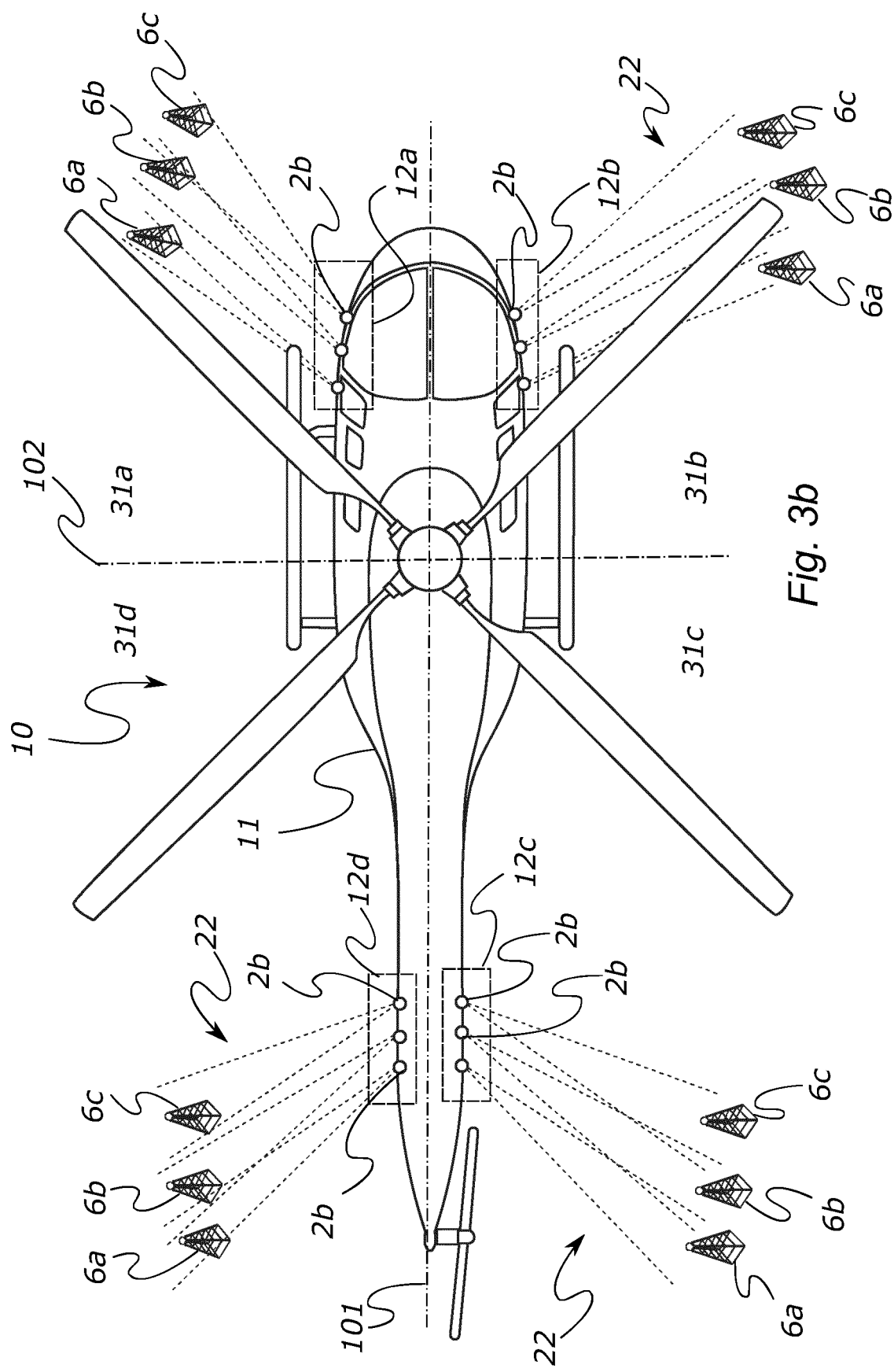

As is more clearly illustrated in FIG. 3b, the aircraft comprises a first axis 101 (roll axis) and a second axis 102 which is transverse to the first axis 101. The two axes 101, 102 both extend in a common horizontal plane and together define four non-overlapping sectors 31a-31d of the ground surface below the aircraft 10. Accordingly, each group 12a-12d of directional antennas 2b is arranged or oriented to radiate and/or receive radio wave towards/from a respective non-overlapping sector 31a-31d. In the illustrated embodiment, the second axis 102 is perpendicular to the first axis 101 and may be construed as a pitch axis, however, the skilled reader realizes that the second axis 102 need to be perfectly perpendicular to the first axis 101 in order to achieve the desired effect.

Moreover, the aircraft 10 further has a vertical axis (not shown) which together with the first axis 101 defines a first vertical plane, and together with the second axis 102 defines a second vertical plane which intersects the first vertical plane. The two planes effectively define four separate portions of the aircraft's fuselage 11. Each group 12a-12d of directional antennas 2b is arranged at a respective portion of the aircraft's fuselage 11 in order to provide sufficient separation between different antenna groups and utilize the fuselage 11 to reduce the chance of beams 22 overlapping between different groups 12a-12d.

Figure 5:
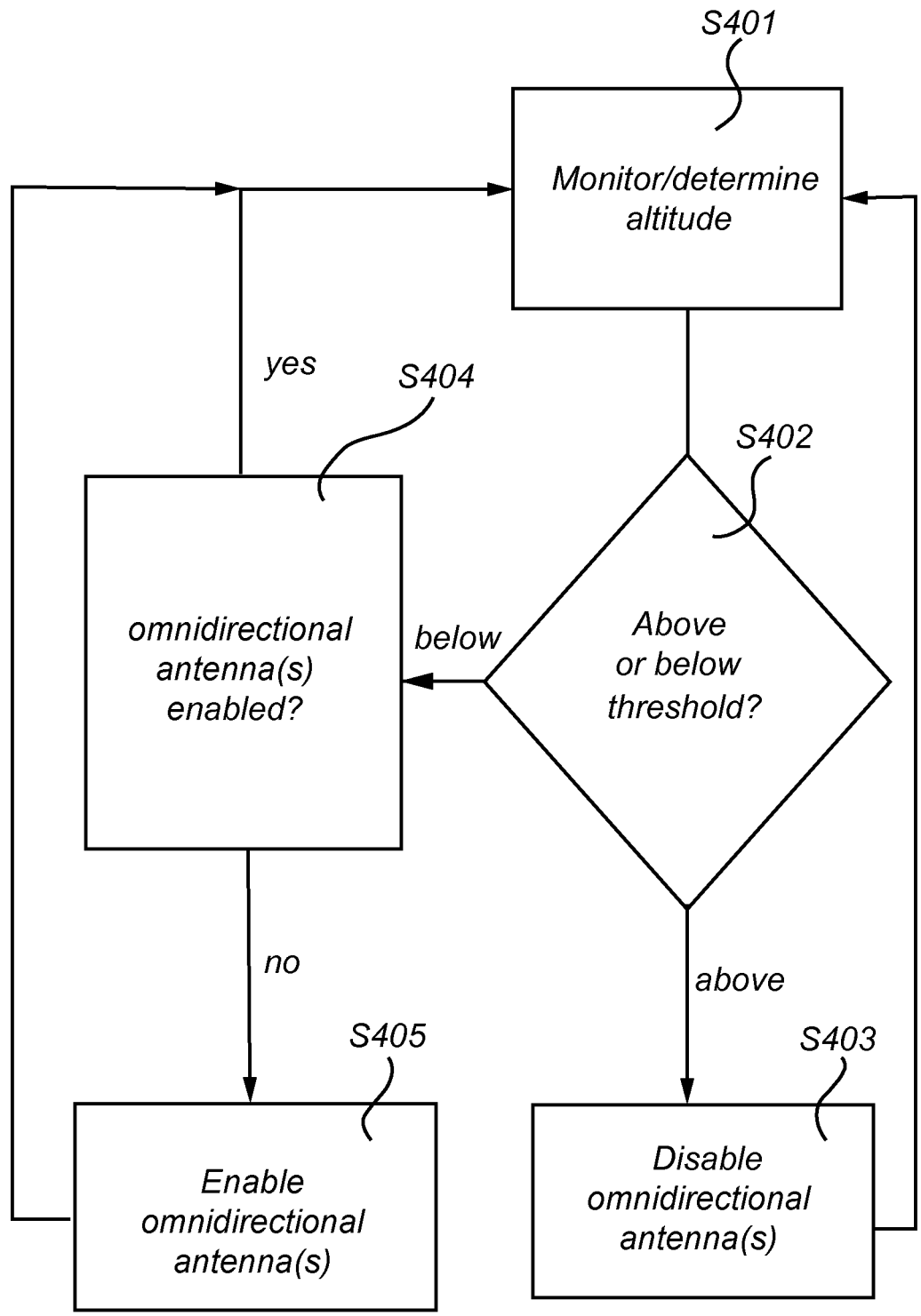
FIG. 5 is a schematic flow chart representation of a method for wireless data communication in accordance with an embodiment of the present invention.

FIG. 5 is a schematic flow chart representation of a method for wireless data communication between a wireless communication system in an aircraft and a stationary communication server outside the aircraft, in accordance with an embodiment of the invention.

Firstly, a router is provided within the aircraft. The router may be any router according to any of the above discussed embodiments of the inventive wireless communication system. The router is connected to a plurality of antennas and configured to transmit and receive wireless data communication to and from the stationary communication server outside the aircraft through at least one ground base station via at least one of the antennas. Moreover, the plurality of antennas comprises one or more omnidirectional antennas and one or more directional antennas.

Next, an altitude of the aircraft is monitored/determined, S401. When the current altitude is determined by an altitude determining unit or any control unit of the router, a check is performed, S402, to see whether the determined altitude of the aircraft is above or below a predefined altitude threshold value. If it is determined that the altitude of the aircraft is above the predefined altitude threshold value, the omnidirectional antenna(s) is/are disabled, S403, in order to restrict the wireless data communication to solely occur through the directional antenna(s).

However, if it would have been determined that the altitude of the aircraft was below the predefined altitude threshold value, a check is performed, S404, to see if the omnidirectional antenna(s) is/are enabled. If all the statement is true, then one goes back to monitoring/determining, S401, the altitude of the aircraft, if the omnidirectional antenna(s) is/are disabled, one preferably enables all of the available omnidirectional antennas, S405, and then returns back to monitoring/determining, S401, the altitude of the aircraft.

Figure 6:
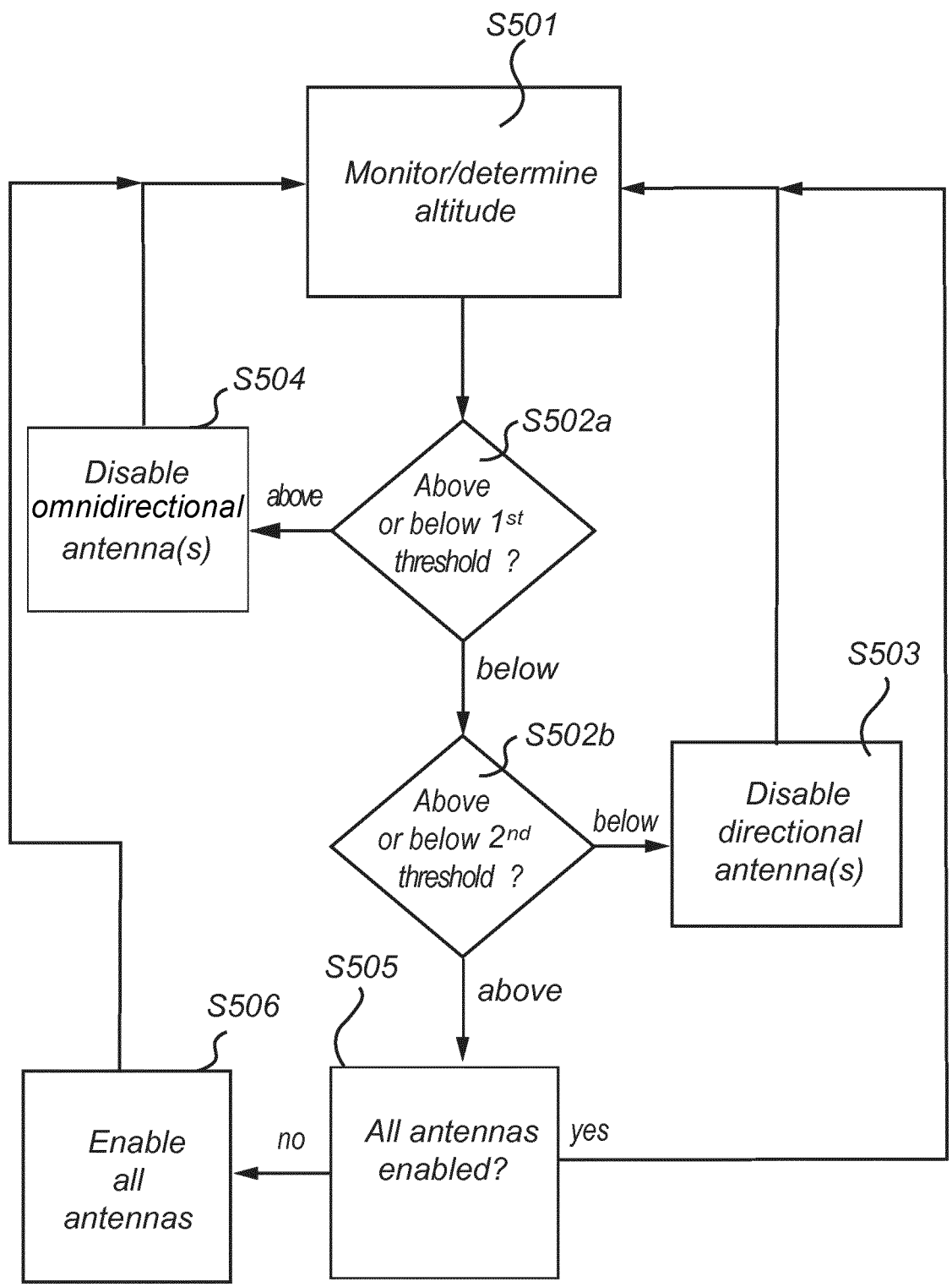
FIG. 6 is a schematic flow chart representation of a method for wireless data communication in accordance with another embodiment of the present invention.

In FIG. 6 another flow chart representation of a method for wireless data communication in accordance with another embodiment of the present invention is illustrated. In this particular embodiment, there are two different altitude threshold values provided in order to make the method more dynamic and agile. More specifically, the method illustrated in FIG. 6 enables for better utilization of the specific advantageous characteristics of the two different antenna types as they differ in performance at different altitudes. Similar to the method described in reference to FIG. 5, a router according to any of the previously discussed embodiments of the invention is provided, and the altitude of the aircraft is monitored/determined, S501 (e.g. by an altitude determining unit).

Further, a check is performed, S502a, to see if the altitude of the aircraft is above or below a first altitude threshold value (e.g. above 1300 m). If it is determined that the aircraft's altitude is above the first altitude threshold (i.e. the aircraft is currently at high altitude), the omnidirectional antenna(s) is/are disabled, S504, or at least they are not available for receiving and transmitting radio signals.

However, if it would have been determined that the aircraft's altitude was below the first threshold, the method includes a step of determining, S502b, if the altitude of the aircraft is above or below a second altitude threshold level (e.g. above or below 600 m). If it is determined to be below the second altitude threshold value (i.e. the aircraft is currently at low altitude) then the directional antenna(s) is/are disabled.

Further, if it would have been determined/concluded that the aircraft's altitude was above the second altitude threshold (i.e. the aircraft is currently at mid altitude), then the method preferably comprises a step of checking, S505, if all antennas are enabled. If all antennas are enabled, go back to monitoring/determining, S501, the altitude, if not, then all antennas are enabled or at least made available for wireless data communication between the aircraft the external ground base stations.

The invention has now been described with reference to specific embodiments. However, several variations of the communication system are feasible. For example, the control unit may restrict communication to certain frequency bands at certain altitude ranges, the number of modems may vary, and so on. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A wireless communication system for an aircraft, said wireless communication system comprising:
   a router connected to a plurality of antennas, wherein the router is configured to transmit and receive wireless data communication to and from a stationary communication server outside said aircraft through at least one ground base station via at least one antenna out of the plurality of antennas;
   an altitude determining unit configured to determine a current altitude of said aircraft; and
   a control unit,
   wherein said plurality of antennas comprises at least one omnidirectional antenna and at least one directional antenna; and
   wherein said control unit is operably connected to said altitude determining unit, said control unit being configured to restrict or disable the wireless data communication through said at least one omnidirectional antenna when the current altitude of said aircraft is above a certain altitude.

2. The wireless system of claim 1, wherein said router comprises the control unit configured to restrict said wireless data communication to solely occur through said at least one directional antenna when said current altitude of said aircraft is above a predefined altitude threshold value.

3. The wireless system according to claim 1, wherein the control unit is further configured to:
   evaluate a data link quality between said at least one ground base station and said at least one omnidirectional antenna; and
   disable or restrict said at least one omnidirectional antenna when said data link quality is below a predefined quality threshold value.

4. The wireless communication system according to claim 1, wherein said plurality of antennas are mounted to an external surface of said aircraft.

5. The wireless communication system according to claim 1, wherein said plurality of antennas are integrated in an external surface of said aircraft.

6. The wireless communication system according to claim 1, wherein said certain altitude is in the range of 200-5000 m.

7. The wireless communication system according to claim 1, wherein said certain altitude is a first altitude threshold value; and the control unit being further configured to:
receive and store a second altitude threshold value which is lower than said first altitude threshold value,
to restrict said wireless data communication to solely occur through said at least one omnidirectional antenna when the current altitude is determined to be below said second altitude threshold value.

8. The wireless communication system according to claim 1, wherein said plurality of antennas comprises at least two groups of directional antennas, each group comprising at least one directional antenna and each group being arranged to radiate and/or receive radio waves to and/or from sectors of a ground surface below the aircraft, the sectors being at least mostly non-overlapping.

9. The wireless communication system according to claim 1,
wherein said aircraft comprises a first axis and a second axis transverse to said first axis, said first axis and second axis extending in a common horizontal plane and together define four sectors of the ground surface when projected onto the ground surface below the aircraft;
wherein the plurality of antennas comprises four groups of directional antennas, each group comprising at least one directional antenna and each group being oriented to radiate and/or receive radio waves towards/from a separate sector, the sectors being at least mostly non-overlapping.

10. The wireless communication system according to claim 1, wherein said aircraft comprises a roll axis and a pitch axis which define four separate quadrant sectors when projected onto a ground surface below the aircraft; and
wherein the plurality of antennas comprises four groups of directional antennas, each group comprising at least one directional antenna and each group being oriented to radiate and/or receive radio waves towards/from a separate quadrant sector.

11. The wireless communication system according to claim 1, wherein the plurality of antennas comprises at least two omnidirectional antennas distributed along a length of the aircraft.

12. The wireless communication system according to claim 1, wherein at least some of the antennas are orthogonal pair antennas.

13. The wireless communication system according to claim 12, wherein said orthogonal pair antennas are antenna pairs with orthogonal polarization.

14. A wireless communication system for an aircraft, said wireless communication system comprising:
a router connected to a plurality of antennas, wherein the router is configured to transmit and receive wireless data communication to and from a stationary communication server outside said aircraft through at least one ground base station via at least one antenna out of the plurality of antennas,
wherein said plurality of antennas comprises at least one omnidirectional antenna and at least one directional antenna; and
wherein said wireless communication system is configured to restrict the wireless data communication through said at least one omnidirectional antenna when a current altitude of said aircraft is above a certain altitude,
wherein said aircraft comprises a first axis and a second axis transverse to said first axis, said first axis and second axis extending in a common horizontal plane and together define four sectors of the ground surface when projected onto the ground surface below the aircraft,
wherein the plurality of antennas comprises four groups of directional antennas, each group comprising at least one directional antenna and each group being oriented to radiate and/or receive radio waves towards/from a separate sector, the sectors being at least mostly non-overlapping,
wherein said aircraft further comprises a vertical axis, a roll axis, and a pitch axis, and wherein said roll axis and vertical axis together define a first vertical plane, and wherein said pitch axis and vertical axis together define a second vertical plane intersecting said first vertical plane,
wherein said first vertical plane and said second vertical plane together define four separate portions of a fuselage of the aircraft, and
wherein said four groups of directional antennas are arranged at separate portions of said fuselage.

15. A method for wireless data communication between a wireless communication system in an aircraft and a stationary communication server outside the aircraft, said method comprising:
providing a router within the aircraft, the router being connected to a plurality of antennas and configured to transmit and receive wireless data communication to and from the stationary communication server outside the aircraft through at least one ground base station via at least one antenna out of the plurality of antennas, wherein the plurality of antennas comprises at least one omnidirectional antenna and at least one directional antenna;
providing the wireless communication system with an altitude determining unit configured to determine a current altitude of said aircraft, and a control unit;
determining the current altitude of the aircraft using the altitude determining unit; and
restricting or disabling, using the control unit, the wireless data communication through said at least one omnidirectional antenna when the current altitude of said aircraft is above a certain altitude.

16. The method of claim 15, wherein said restricting restricts said wireless data communication to solely occur through said at least one directional antenna when said current altitude of the aircraft is above a predefined altitude threshold value.

17. The method according to claim 15 further comprising:
disabling wireless data communication via said at least one omnidirectional antennas when the current altitude is determined to be above said certain altitude.

18. The method according to claim 15, wherein said certain altitude is a first altitude threshold value, and wherein said method further comprises:
disabling wireless data communication via said at least one directional antennas when the current altitude threshold value is below a second altitude threshold value, said second altitude threshold value being lower than said first altitude threshold value.

* * * * *